United States Patent
Devarapalli et al.

(10) Patent No.: US 10,248,444 B2
(45) Date of Patent: Apr. 2, 2019

(54) METHOD OF MIGRATING VIRTUAL MACHINES BETWEEN NON-UNIFORM MEMORY ACCESS NODES WITHIN AN INFORMATION HANDLING SYSTEM

(71) Applicant: DELL PRODUCTS, L.P., Round Rock, TX (US)

(72) Inventors: Kiran Kumar Devarapalli, Bangalore (IN); Krishnaprasad K, Bangalore (IN); Shiva Prasad Katta, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 428 days.

(21) Appl. No.: 14/230,838

(22) Filed: Mar. 31, 2014

(65) Prior Publication Data

US 2015/0277779 A1 Oct. 1, 2015

(51) Int. Cl.
 G06F 9/455 (2018.01)

(52) U.S. Cl.
 CPC .. *G06F 9/45558* (2013.01); *G06F 2009/4557* (2013.01)

(58) Field of Classification Search
 None
 See application file for complete search history.

(56) References Cited

U.S. PATENT DOCUMENTS

| | | | |
|---|---|---|---|
| 2013/0227531 A1* | 8/2013 | Vijayaraghavan | G06F 11/3624 717/130 |
| 2013/0232252 A1* | 9/2013 | Huang | G06F 9/45558 709/224 |

(Continued)

OTHER PUBLICATIONS

Khanna, Gunjan, et al. "Application performance management in virtualized server environments." Network Operations and Management Symposium, 2006. NOMS 2006. 10th IEEE/IFIP. IEEE, 2006.*

(Continued)

*Primary Examiner* — Charles Rones
*Assistant Examiner* — Hewy H Li
(74) *Attorney, Agent, or Firm* — Isidore PLLC

(57) ABSTRACT

A method for allocating virtual machines (VMs) to run within a non-uniform memory access (NUMA) system includes a first processing node and a second processing node. A request is received at the first processing node for additional capacity for at least one of (a) establishing an additional VM and (b) increasing processing resources to an existing VM on the first processing node. In response to receiving the request, a migration manager identifies whether the first processing node has the additional capacity requested. In response to identifying that the first processing node does not have the additional capacity requested, at least one VM is selected from an ordered array of the multiple VMs executing on the first processing node. The selected VM has low processor and memory usage relative to the other VMs. The selected VM is migrated from the first processing node to the second processing node for execution.

19 Claims, 6 Drawing Sheets

(56) References Cited

OTHER PUBLICATIONS

Keller, Gastón, et al. "An analysis of first fit heuristics for the virtual machine relocation problem." Network and service management (cnsm), 2012 8th international conference and 2012 workshop on systems virtualiztion management (svm). IEEE, 2012.*

Strickland, Jonathan. "How Grid Computing Works". HowStuffWorks. Published Sep. 10, 2011. <https://web.archive.org/web/20110910063038/http://computer.howstuffworks.com/grid-computing.htm>.*

Panigrahy, Rina, et al. "Heuristics for vector bin packing." research. microsoft. com (2011).*

* cited by examiner

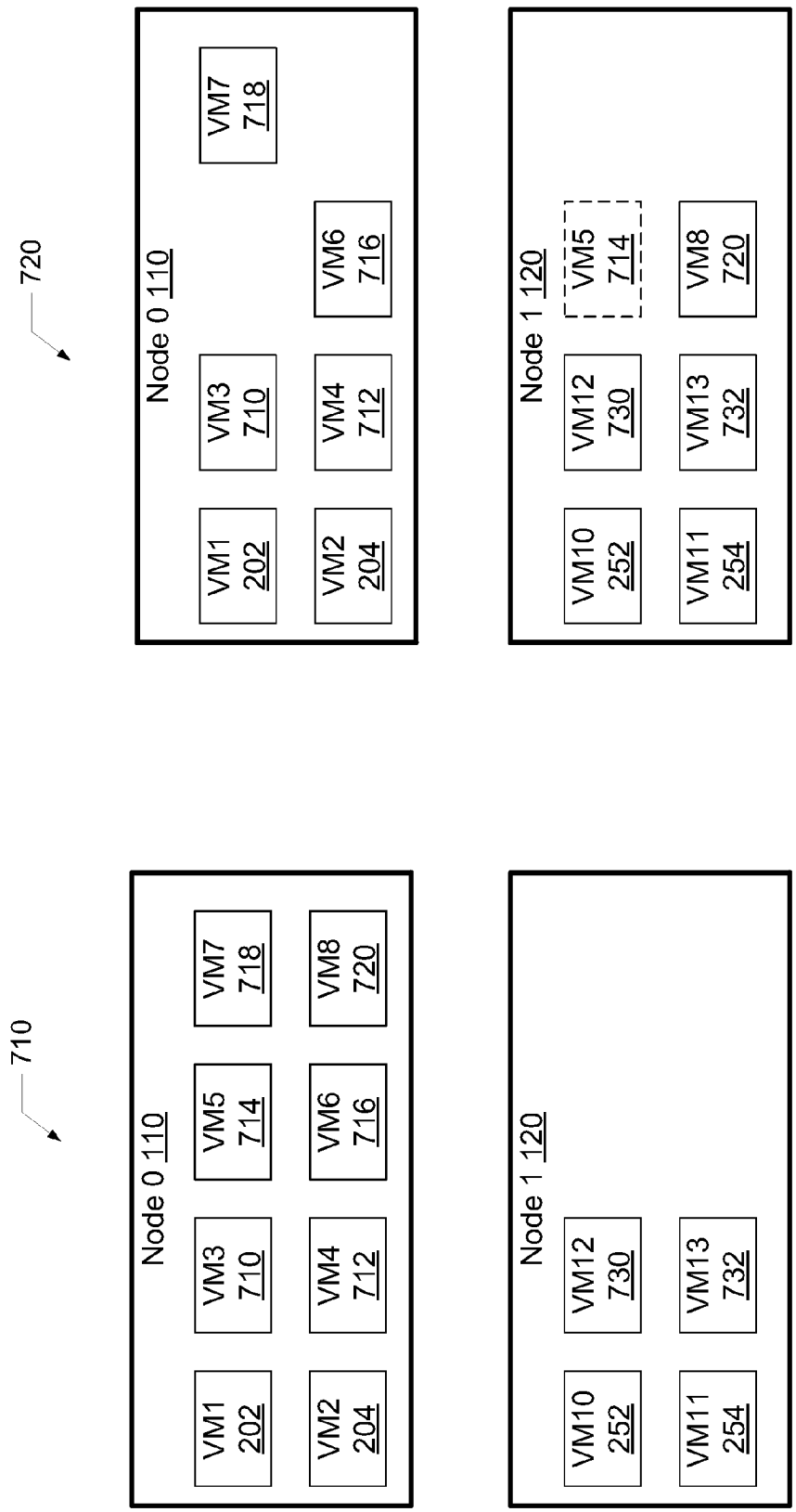

METHOD OF MIGRATING VIRTUAL MACHINES BETWEEN NON-UNIFORM MEMORY ACCESS NODES WITHIN AN INFORMATION HANDLING SYSTEM

BACKGROUND

1. Technical Field

The present disclosure generally relates to information handling systems, and in particular to migrating virtual machines between non-uniform memory access (NUMA) nodes within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system can be a non-uniform memory access (NUMA) machine with interconnected NUMA hardware nodes. The NUMA nodes share memory and I/O resources. Each NUMA node has one or more physical processors and a system memory. Each processor can access the memory associated with another processor via a system interconnection. Each of the NUMA nodes can be partitioned into one or more logical partitions or virtual machines. A virtual machine allows computing resources such as processors, memory and other hardware components to be assigned to one or more logical partitions of the hardware components. The virtual machines can be contained within a single NUMA node or can be implemented across several NUMA nodes dependent upon system requirements. Unfortunately, the performance of a NUMA machine can decrease if the virtual machine has to access memory located in several different NUMA nodes. Multi-node virtual machines can experience increased wait times and latency for remote memory access between several NUMA node system memories.

BRIEF SUMMARY

Disclosed are a method, a non-uniform memory access (NUMA) machine and an information handling system for allocating virtual machines (VMs) to run within a NUMA system for improving processing performance.

According to one embodiment, a computer implemented method allocates VMs to run within a non-uniform memory access system that has a first processing node and a second processing node. The method comprises receiving a request at the first processing node for additional capacity for at least one of (a) establishing an additional VM and (b) increasing processing resources to an existing VM on the first processing node having multiple VMs executing thereon. In response to receiving the request, the method further comprises identifying whether the first processing node has the additional capacity requested. In response to identifying that the first processing node does not have the additional capacity requested, at least one VM is selected from an ordered array of the multiple VMs executing on the first processing node. The selected VM has low processor and memory usage relative to the other VMs. The selected VM is re-assigned from the first processing node to the second processing node. The selected VM is then migrated from the first processing node to the second processing node for execution on the second processing node.

According to another embodiment, a NUMA machine comprises a plurality of operatively interconnected NUMA nodes with each of the NUMA nodes having at least one processor and at least one associated memory. The NUMA nodes are communicatively coupled by a system interconnect fabric such that the processors of each of the NUMA nodes can access the memory of each of the other NUMA nodes. The NUMA nodes include a first NUMA node that has a first processor and a first memory and having multiple VMs executing thereon. The first processor has a migration manager firmware executing thereon to manage the allocation of virtual machines (VMs) within the NUMA nodes. The migration manager configures the first processor to receive a request at the first NUMA node for additional capacity for at least one of (a) establishing an additional VM and (b) increasing processing resources to an existing VM on the first NUMA node. In response to receiving the request, the migration manager identifies whether the first NUMA node has the additional capacity requested. In response to identifying that the first NUMA node does not have the additional capacity requested, at least one VM having low processor and memory usage relative to the other VMs is selected, by the migration manager, from an ordered array of the multiple VMs executing on the first NUMA node. The selected VM is re-assigned from the first NUMA node to the second NUMA node. The migration manager migrates the selected VM from the first NUMA node to the second NUMA node for execution.

Also disclosed is an information handling system (IHS) that comprises a first NUMA node and a second NUMA node. The first NUMA node has a first processor and a first memory. The second NUMA node has a second processor and a second memory. A system interconnect fabric communicatively couples the first NUMA node and the second NUMA node such that the processors of each of the NUMA nodes can access the memory of each of the other NUMA nodes. The first processor has a migration manager firmware executing thereon to manage the allocation of virtual machines (VMs) within the NUMA nodes. The migration manager configures the first processor to receive a request at the first NUMA node for additional capacity for at least one of (a) establishing an additional VM and (b) increasing processing resources to an existing VM on the first NUMA node having multiple VMs executing thereon. In response to receiving the request, the migration manager identifies whether the first NUMA node has the additional capacity requested. In response to identifying that the first NUMA node does not have the additional capacity requested, at least one VM having low processor and memory usage relative to the other VMs is selected, by the migration manager, from an ordered array of the multiple VMs executing on the first NUMA node. The selected VM is re-assigned from the first NUMA node to the second NUMA node. The migration manager migrates the selected VM from the first NUMA node to the second NUMA node for execution.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates an example of VMs running on NUMA nodes prior to being re-assigned.

FIG. 8 illustrates an example of VMs running on NUMA nodes after one or more of the VMs have been re-assigned for execution and migrated to another NUMA node.

DETAILED DESCRIPTION

The illustrative embodiments provide a method, a non-uniform memory access (NUMA) machine and an information handling system for allocating virtual machines (VMs) to run within a NUMA system for improving processing performance.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
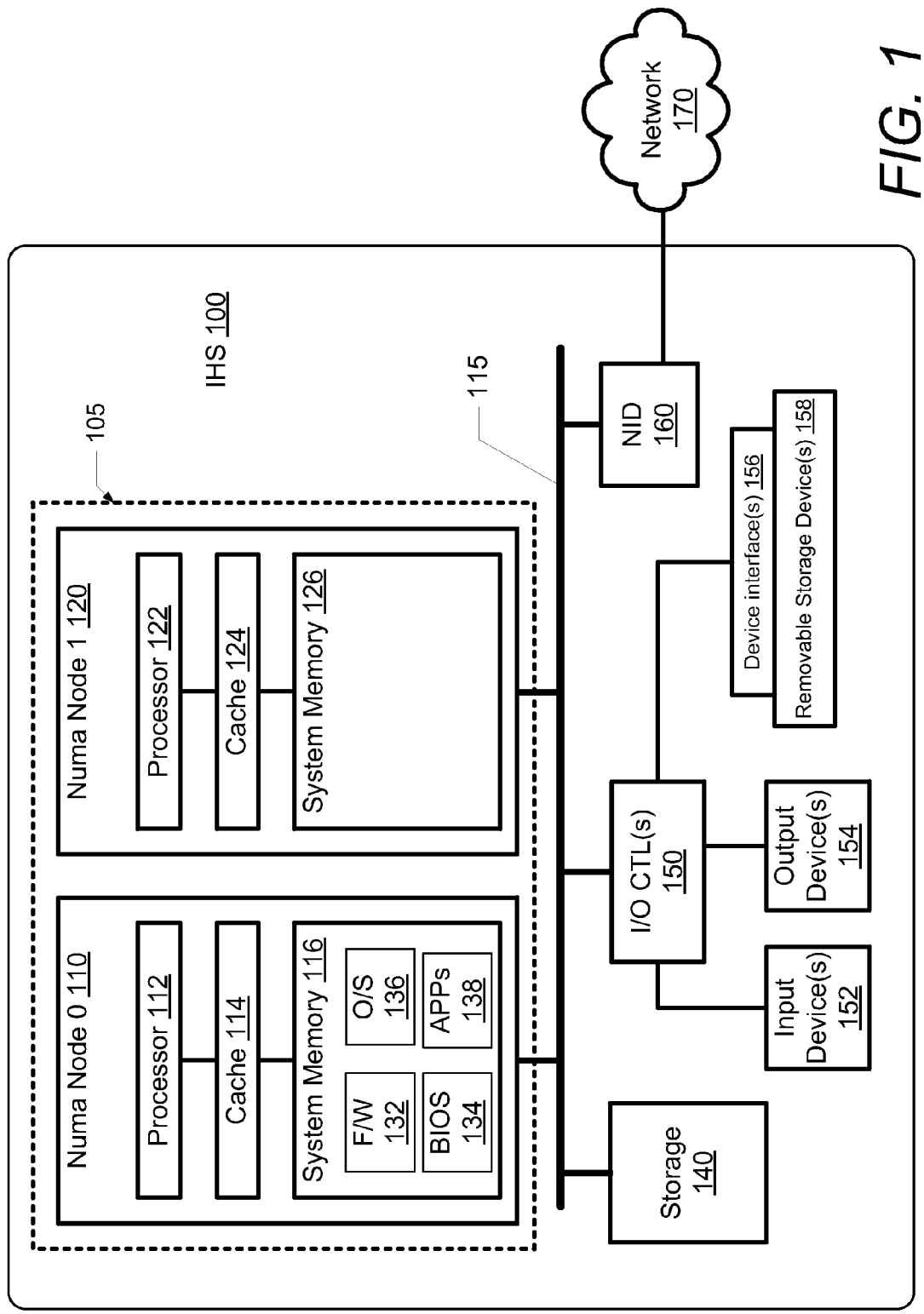
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 comprises a non-uniform memory access (NUMA) machine 105 that includes NUMA node 0 110 and NUMA node 1 120. NUMA nodes 110 and 120 are interconnected such that the nodes share memory and I/O resources. NUMA node 0 110 includes processor 112 coupled to cache memory 114. Cache memory 114 stores frequently used data, and cache memory 114 is further coupled to system memory 116. In one embodiment, NUMA node 0 110 can include more than one (i.e., multiple) processors. NUMA node 1 120 includes processor 122 coupled to cache memory 124. Cache memory 124 is coupled to system memory 126. In one embodiment, NUMA node 1 120 can include more than one processor. NUMA nodes 110 and 120 are interconnected via system interconnect 115. System interconnect 115 can be interchangeably referred to as a system bus, in one or more embodiments. Specifically, system memory 116 and system memory 126 are communicatively connected via system interconnect 115 such that processor 112 can access system memory 126 and processor 122 can access system memory 116. System memory 116 can include therein a plurality of software and/or firmware modules including firmware (F/W) 132, basic input/output system (BIOS) 134, operating system (O/S) 136, and application(s) 138. The one or more software and/or firmware modules within system memory 116 can be loaded into processors 112 and 122 during operation of IHS 100.

IHS 100 further includes one or more storage devices 140 such as hard disk drives or non-volatile memory drives for the storage of data and information. One or more input/output (I/O) controller(s) 150 are coupled to system interconnect 115. I/O controller(s) 150 support the connection by, and processing of signals from, one or more connected input device(s) 152, such as a keyboard, mouse, touch screen, or microphone. I/O controller(s) 150 also support connection to and forwarding of output signals to one or more connected output devices 154, such as a monitor or display device or audio speaker(s). Additionally, in one or more embodiments, one or more device interface(s) 156, such as an optical reader, a universal serial bus (USB), a card reader, Personal Computer Memory Card International Association (PCMCIA) slot, and/or a high-definition multimedia interface (HDMI), can be associated with IHS 100. Device interface(s) 156 can be utilized to enable data to be read from or stored to corresponding removal storage device(s) 158, such as a compact disk (CD), digital video disk (DVD), flash drive, or flash memory card. Device interface(s) 156 can further include General Purpose I/O interfaces such as $I^2C$, SMBus, and peripheral component interconnect (PCI) buses.

IHS 100 comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Those of ordinary skill in the art will appreciate that the hardware components and basic configuration depicted in FIG. 1 and the other hardware-based figures and described herein may vary. For example, the illustrative components within IHS 100 are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure. In the discussion of each of the following figures, reference is also made to components illustrated in the preceding figures, for continuity of the description.

Figure 2:
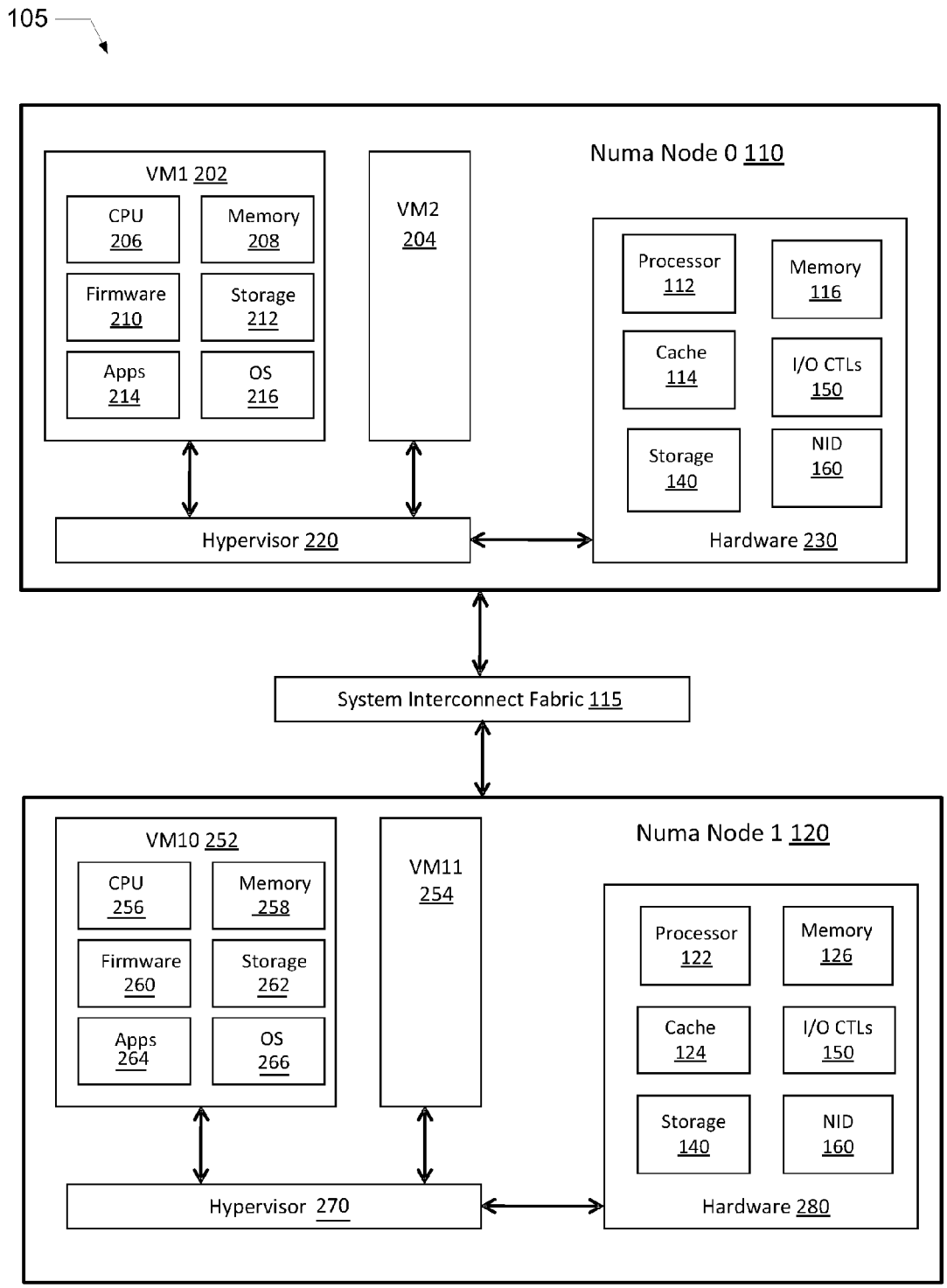
FIG. 2 illustrates a block diagram representation of virtual machines operating on multiple nodes of a non-uniform memory access (NUMA) machine according to one or more embodiments.

With reference now to FIG. 2, there is shown further details of NUMA machine 105 operating multiple virtual machines in a logically partitioned system according to an embodiment. NUMA node 0 110 includes several virtual machines (VMs) such as VM1 202 and VM2 204. While two VMs are illustrated, many additional VMs can be configured in NUMA node 0 110. Each of VMs 202 and 204 comprises a division of the computing capabilities or resources of NUMA node 0 110.

Each VM, such as example VM1 202, comprises a virtual central processing unit (CPU) or processor 206, virtual memory 208, virtual firmware 210 and virtual storage 212. VM1 202 further includes functional modules or software modules such as virtual operating system (OS) 216 and application software 214. Application software 214 is executed by processor 206 within VM1 202. VM1 202 and VM2 204 operate under the control of hypervisor 220. Each VM can communicate with hypervisor 220 and with each other through hypervisor 220. Hypervisor 220 manages interaction between and allocates resources to VM1 202 and VM2 204 including processor resources such as virtual processor 206. Hypervisor 220 controls the operation of VM1 202 and VM2 204, allowing multiple operating systems to run, unmodified, at the same time on IHS 100, and provides a measure of robustness and stability to the system. Each operating system within the hypervisor operates independently of the others, such that if one operating system experiences a failure, the other operating systems can continue working without interruption.

NUMA node 0 110 further includes hardware 230 upon which VM1 202 and VM2 204 are implemented. Hardware 230 comprises one or more processing units or processors 112, cache memory 114, system memory 116, storage devices 140 such as a hard drive, one or more I/O controllers 150 and one or more network interfaces (NID) 160. Hypervisor 220 is in communication with hardware 230. Hypervisor 220 allows multiple operating systems and applications to share a single hardware host. Hypervisor 220 controls the operation of hardware 230 including processor 112. Hypervisor 220 allocates resources to each VM.

Similar to NUMA node 0 110, NUMA node 1 120 can include several VMs such as VM10 252 and VM11 254. While two VMs are illustrated, many additional VMs can be provided in NUMA node 1 120. Each of the VMs 252 and 254 is a division of resources of NUMA node 1 120.

Each VM, such as VM10 252, comprises a virtual processor (CPU) 256, virtual memory 258, virtual firmware 260 and virtual storage 262. VM10 252 further includes functional modules or software modules such as virtual operating system (OS) 266 and application software 264. Application software 264 is executed within VM10 252. VM10 252 and VM11 254 operate under the control of hypervisor 270. Each VM can communicate with each other and with hypervisor 270. Hypervisor 270 manages interaction between and allocates resources between VM10 252 and VM11 254 and virtual processor (CPU) 256. Hypervisor 270 controls the operation of VM10 252 and VM11 254 and allows multiple operating systems to run, unmodified, at the same time on NUMA node 1 120 and provides a measure of robustness and stability to the system. Each operating system 266 within the hypervisor operates independently of the others, such that if one operating system experiences a failure, the other operating systems can continue working without interruption.

NUMA node 1 120 further includes hardware 280 upon which VM10 252 and VM11 254 are implemented. Hardware 280 has a processing unit or processer 122, cache memory 124, system memory 126, storage 140 such as a hard drive, an I/O controller(s) 150 and a network interface (NID) 160. Hypervisor 270 is in communication with hardware 280. Hypervisor 270 allows multiple operating systems and applications to share a single hardware host. Hypervisor 270 controls the operation of hardware 280 including processor 122 and other system resources allocating resources to each VM.

System interconnect fabric 115 provides communications between NUMA node 0 110 and NUMA node 1 120. System interconnect fabric 115 allows hypervisors 220 and 270 to communicate with each other and to transfer data and operating parameters between NUMA node 0 110 and NUMA node 1 120.

Figure 3:
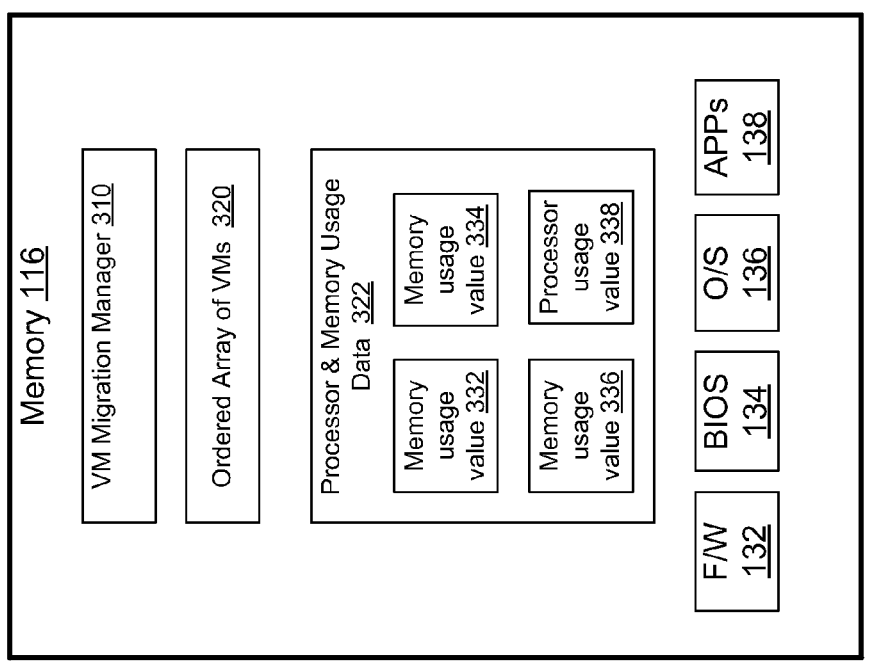
FIG. 3 is a block diagram illustrating contents of the system memory of one of the NUMA nodes, in accordance with one embodiment.

FIG. 3 illustrates example contents of system memory 116. In the discussion of FIG. 3, reference is also made to components of FIGS. 1 and 2. System memory 116 can include software and/or firmware modules including firmware (F/W) 132, basic input/output system (BIOS) 134, operating system (O/S) 136, and application(s) 138. The one or more software and/or firmware modules within system memory 116 can be loaded into processors 112 and 122 during operation of IHS 100.

System memory 116 further includes VM migration manager 310, as well as ordered array of VMs 320 and processor and memory usage data 322. VM migration manager 310 is software or firmware that can be loaded into processor 112 during operation of IHS 100 (FIG. 1). VM migration manager 310 manages the re-assignment of VMs from NUMA node 0 110 to NUMA node 1 120 based on ordered array of VMs 320 of the multiple VMs executing on NUMA node 0 110. The VMs are selected for migration by VM migration manager 310 based on having low processor and memory usage relative to the other VMs, which is directly correlated to the location of each VM within the ordered array of VMs 320. Ordered array of VMs 320 contains a ranked listing of the VMs executing on NUMA node 1 120. The VMs having low processor and memory usage are ranked first and the VMs having high processor and memory usage are ranked last in ordered array of VMs 320. Migration manager 310 executing on processor 112 (FIG. 1) tracks the processor and memory usage data of VM1 202 and VM2 204 (FIG. 2) over time and stores the resulting VM processor and memory usage data 322 to memory 116. VM migration manager 310 generates the ordered array of VMs 320 based on a ranking of processor and memory usage data 322.

Processor and memory usage data 322 includes several types of processor and memory usage data. Processor and memory usage data 322 is based on the actual hardware usage caused by VMs 202, 204, 252 and 254 running on processor 112 and using both system memory 116 of NUMA node 0 110 and system memory 126 of NUMA node 1 120 (See FIG. 2). Processor and memory usage data 322 includes a first memory usage value 332 associated with memory usage of system memory 116 by processor 112, a second memory usage value 334 associated with memory usage of system memory 126 by processor 112, a third memory usage value 336 that is a percentage used of the total system memory 116 and a processor usage value 338 for processor 112.

According to one embodiment, the relative percentages of utilization of memory resources, measured in cycles, by the individual VMs associated with NUMA Node 0 110 are tracked and recorded as the primary weighing factor utilized in ranking the VMs of NUMA Node 0 110. The utilization of processor resources can also be utilized as a secondary weighting factor. The utilization of the memory resources and the processor resources can be measured in memory cycles and processor cycles, respectively, in one embodiment. With the example of FIG. 3, the first memory usage value 332 can be given the highest weighting factor or priority in ranking the VMs. The processor usage value 338 is only used in the event the value of the first memory usage value 332 is the same for two different VMs. The VM consuming the least amount of memory (or memory cycles) is placed first into ordered array of VMs 320 and the other VMs, which consume more memory resources, are placed into ordered array of VMs 320 in ascending order of memory resource usage. For example, if there is a particular VM running on NUMA Node 1 110 that has a low first memory usage value 332, VM migration manager 310 will rank that particular VM as the highest element in the ordered array of VMs 320, regardless of the level of processor resource usage. Thus, for example, the migration manager 310 will rank the VM having the lowest first memory usage value 332 as the high entry within the ordered array of VMs 320 even if the VM has the highest processor usage value 338. VM migration manager 310 uses first memory usage value 332 to rank the VMs in the ordered array of VMs 320. In the event that the first memory usage value 332 is the same for two different VMs running on NUMA Node 1 110, VM migration manager 310 uses the respective processor usage value 338 for each of the two different VMs as a tie breaker in the ranking That is, as between the two VMs with the same first memory usage value 332, the VM with the lower processor usage value 338 would be ranked higher in ordered array of VMs 320.

The ordering of the VMs within the NUMA node and selection of which VMs to migrate across NUMA nodes can be further influenced by the level of processor usage. Prior to performing a migration, the existing migration logic checks the processor load on each of the NUMA nodes. If the processor utilization of NUMA node 0 110 is more, the migration logic skips the VM in the ordered array 320, which is utilizing more processor resources, even though the VM is less memory intensive. In this case, the migration logic should select the VM (from the ordered array of VMs 320) which utilizes less processor resources and is comparatively less memory intensive. If the processor utilization of NUMA Node 0 110 is less, then VM migration manager 310 selects the first element in the ordered array 320 for migration, even if the processor resource utilization of the VM is more.

Figure 4:
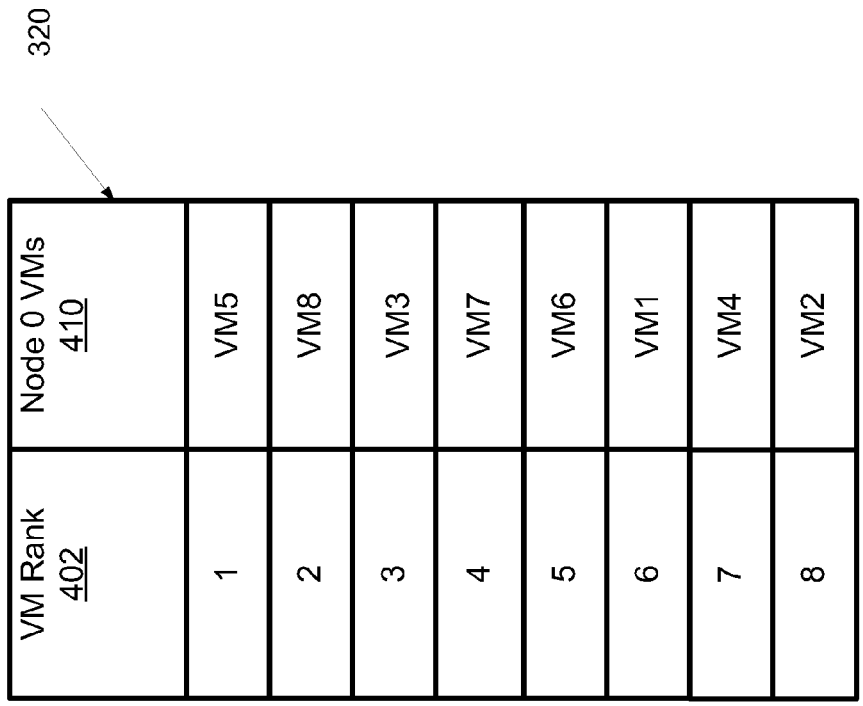
FIG. 4 is an example lookup table that contains an array of virtual machines (VMs) ranked in order of increasing processor and memory usage, according to one or more embodiments.

FIG. 4 illustrates a lookup table of the ordered array of VMs 320 that ranks each of the VMs executing on NUMA node 0 110 by processor and memory usage. Ordered array of VMs 320 includes the VM rank number 402 and the corresponding NUMA node 0 VMs 410 ranked in order of increasing processor and memory usage. The VMs having low processor and memory usage are ranked first and the VMs having high processor and memory usage are ranked last in ordered array of VMs 320. VM5 is ranked first in the NUMA node 0 VMs 410 ranking because VM5 has the lowest usage of processor and memory resources in NUMA node 0 110. VM2 204 is ranked last in the NUMA node 0 VMs 410 ranking because VM2 has the highest usage of processor and memory resources in NUMA node 0 110.

According to one aspect of the disclosure, a non-uniform memory access machine 105 includes NUMA node 0 110 and NUMA node 1 120. A request is received at NUMA node 0 110 for additional capacity that is to be used for at least one of (a) establishing an additional VM and (b) increasing processing resources to an existing VM1 202 on NUMA node 0 110. In the illustrative embodiment, NUMA node 0 110 has multiple VMs, VM1 202 and VM2 204, executing thereon. In response to receiving the request, migration manager 310 executing on processor 112 identifies whether NUMA node 0 110 has the additional processor or memory resource capacity requested. In response to identifying that NUMA node 0 110 does not have the additional processing capacity requested, migration manager 310 selects from an ordered array of the multiple VMs 320 executing on NUMA node 0 110, at least one VM having low processor and memory usage relative to the other unselected VMs to be re-assigned from NUMA node 0 110 to NUMA node 1 120. Processor 112 executes VM migration manager 310, which migrates the selected VM from NUMA node 0 110 to NUMA node 1 120 for execution. The migration of VMs that use less memory and processor resources from NUMA node 0 110 to NUMA 1 node 120 for execution is more efficient because (1) the VMs that are more memory and processor resource intensive continue execution on NUMA node 0 110 without interruption and (2) the VMs that use less memory and processor resources are easier to migrate to NUMA node 1 120.

Figure 5:
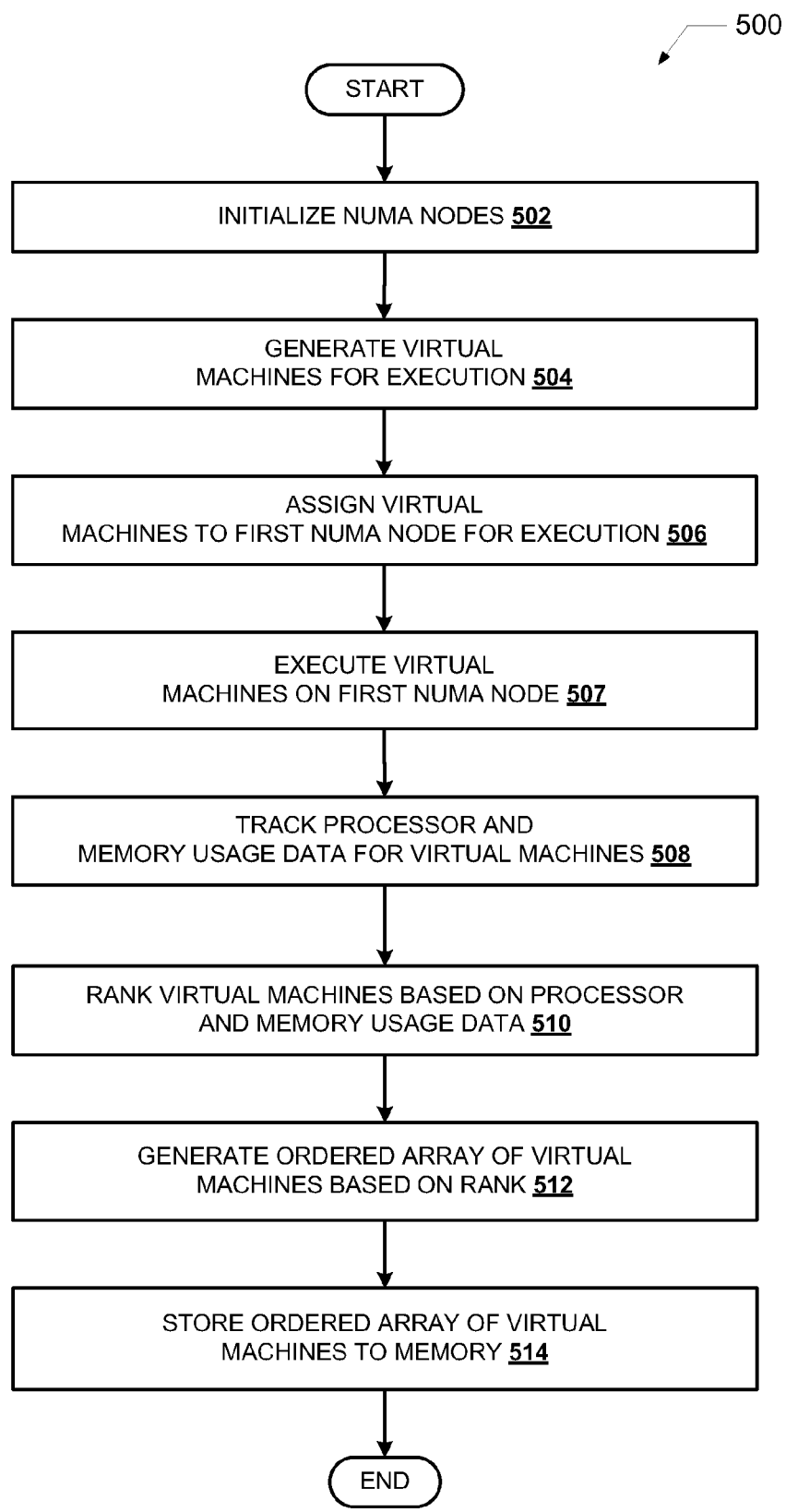
FIG. 5 is a flow chart illustrating one example of the method by which an ordered array of VMs is generated by ranking the VMs based on processor and memory usage, according to one or more embodiments.
Figure 6:
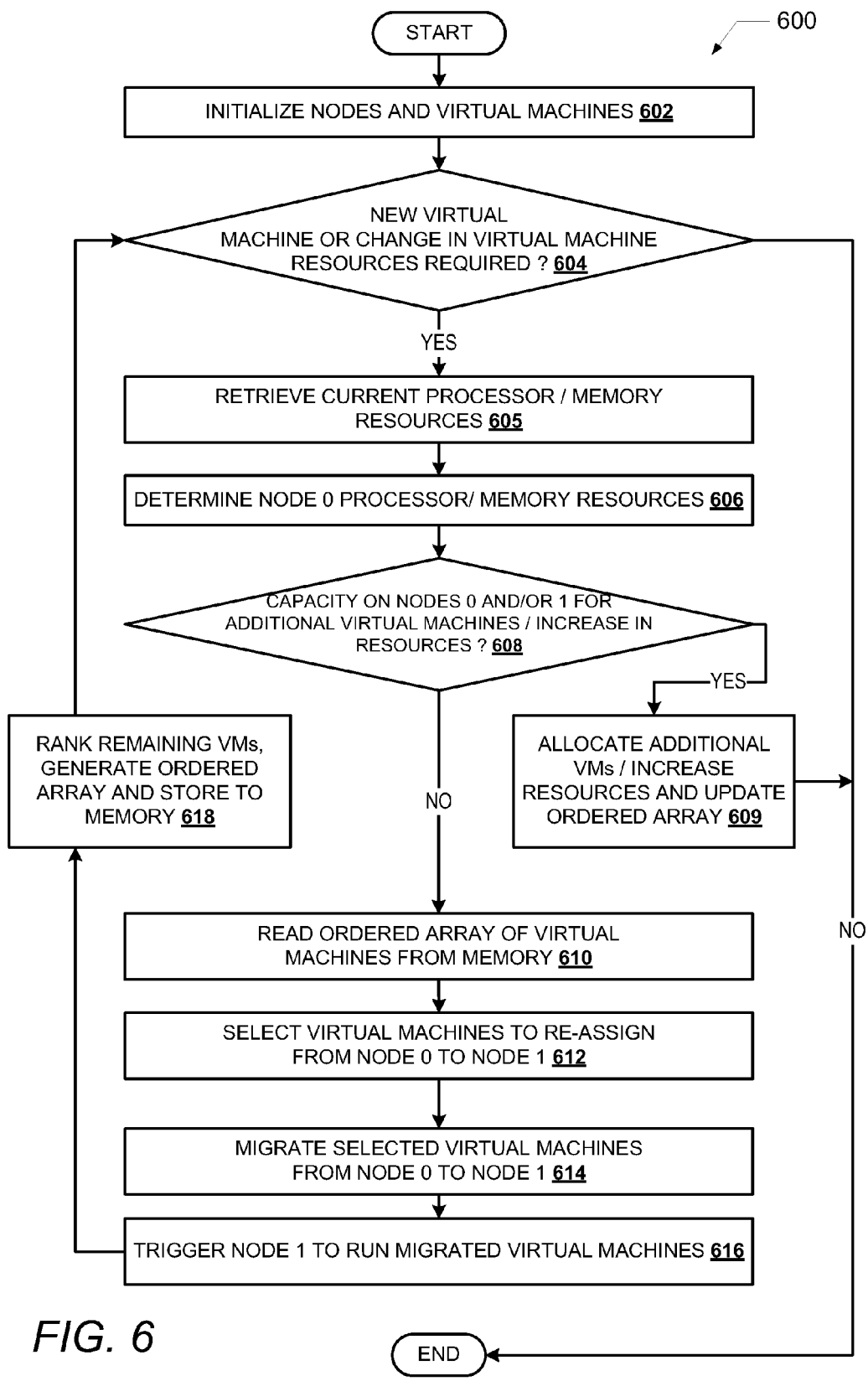
FIG. 6 is a flow chart illustrating one example of the method by which VMs are re-assigned for execution from one NUMA node to another NUMA node, according to one or more embodiments.

FIGS. 5-6 illustrate flowcharts of exemplary methods for (1) generating an ordered array of VMs by ranking the VMs based on processor and memory usage, (2) improving overall execution speed within a NUMA machine by re-assigning VMs for execution from one NUMA node to another NUMA node. Generally, methods 500 and 600 respectively represent computer-implemented methods to generate an ordered array of ranked VMs and to migrate VMs having low processor and memory usage from one NUMA node to another NUMA node for execution. In the discussion of FIGS. 5-6, reference is also made to components illustrated in FIGS. 1-4. Generally methods 500 and 600 are described as being implemented via processor 112 and particularly the execution of code provided by VM migration manager 310 acting within processor 112. It is however appreciated that certain aspects of the described methods may be implemented via other processing devices and/or execution of other code.

Method 500 begins at the start block and proceeds to block 502 at which processor 112 initializes the NUMA nodes 110 and 120. The initialization of NUMA nodes 110 and 120 includes the loading of BIOS 134, O/S 136 and APPs 138 by processors 112 and 122. At block 504, hypervisor 220 generates multiple VMs such as VMs 1-10 including VMs 202, 204 for execution on processor 112. Hypervisor 270 generates multiple VMs including VMs 252, 254 for execution on processor 122. At block 506, hypervisor 220 initially assigns one or more VMs 202, 204 to be executed on NUMA node 0 110. Processor 112 executes the multiple VMs on NUMA node 0 110 (block 507). VM migration manager 310, acting within processor 112, causes processor 112 to track the processor and memory usage data 322 for the VMs executing on NUMA node 0 110 (block 508). The processor and memory usage data 322 tracked includes, but is not necessarily limited to, first memory usage value 332, second memory usage value 334, third memory usage value 336 and processor usage value 338.

VM migration manager 310 ranks the multiple VMs 202, 204 in order of increasing (or decreasing) processor and memory usage based on the determined processor and memory usage data 322 for each VM (block 510). The VMs having low processor and memory usage are ranked first and the VMs having high processor and memory usage are ranked last by processor 112. VM migration manager 310 generates an ordered array of the ranked VMs 320 executing on NUMA node 0 110 (block 512) and stores the ordered array of the ranked VMs 320 to system memory 116 (block 514). Method 500 then ends.

Turning now to FIG. 6, a flow chart of method 600 is shown. Method 600 begins at the start block and proceeds to block 602 at which processor 112 initializes the NUMA nodes 110 and 120. The initialization of NUMA nodes 110 and 120 includes the loading of BIOS 134, O/S 136 and APPs 138 by processors 112 and 122. Block 602 further includes hypervisor 220 generating multiple VMs such as VMs 1-10 including VMs 202, 204 for execution on processor 112. Hypervisor 270 generates multiple VMs including VMs 252, 254 for execution on processor 122. At decision block 604, VM migration manager 310 executing on processor 112 determines if additional VMs are requested to be executed on NUMA node 0 110 and/or if additional processing resources are required from the existing VMs executing on NUMA node 0 110. In one embodiment, hypervisor 220 can determine that additional VMs are to be executed on NUMA node 0 110. Alternatively, the VMs 202, 204 currently executing may request additional processor and/or memory resources from hypervisor 220. In response to no additional VMs being requested or no additional processor and/or memory resources being requested, method 600 ends. In response to additional VMs being requested and/or additional processor and/or memory resources being requested, VM migration manager 310 executing on processor 112 retrieves information about the allocation and remaining availability of processing resources within NUMA node 0 110 (block 605). VM migration manager 310 executing on processor 112 determines whether there are additional processor and/or memory resources available for VM allocation on NUMA node 0 110 (block 606). VM migration manager 310 executing on processor 112 identifies if NUMA node 0 110 has the additional capacity requested to handle the processing resources required for the additional VM/s (block 608). Also at block 608, VM migration manager 310 executing on processor 112 identifies if NUMA node 1 120 has the additional capacity requested to handle the processing resources required for the additional VMs. NUMA node 0 110 communicates with NUMA node 1 120 in order to determine if NUMA node 1 120 has the additional capacity requested.

In response to identifying that NUMA node 0 110 has the additional processing capacity requested, VM migration manager 310 executing on processor 112 allocates the additional VMs and/or increases the processor and memory resources to NUMA node 0 110 (block 609). Method 600 then terminates. In response to identifying that NUMA node 0 110 does not have the additional processing capacity requested, VM migration manager 310 reads the ordered array of the multiple ordered array of VMs 320 from memory 116 (block 610) and selects at least one VM from the ordered array of the multiple VMs 320 executing on NUMA node 0 110 to be re-assigned from the NUMA node 0 110 to NUMA node 1 120 (block 612). The selected VM/s include/s the lowest ranked VMs (i.e., the VMs having the lowest value of processor and memory usage data 322 relative to the other VMs. For example, as shown in the ordered array of VMs 320 (FIG. 4), processor 112 would select VM5 as the selected VM from among the node 0 VMs 410 as VM5 has the lowest processor and memory usage data value relative to the other VMs. VM migration manager 310 executing on processor 112 re-assigns and migrates the one or more selected VMs (i.e., VM5) from NUMA node 0 110 to NUMA node 1 120 (block 614). VM migration manager 310 triggers processor 122 to execute the migrated VMs (i.e., VM5) on NUMA node 1 120 (block 616).

At block 618, VM migration manager 310 executing on processor 112 re-ranks the remaining multiple VMs of NUMA node 0 110 in order of increasing (or decreasing) processor and memory usage based on the determined processor and memory usage data 322 for each VM, generates a new array of the ranked VMs 320 and stores the ordered array of the ranked VMs 320 to system memory 116. When multiple VMs need to be migrated, the next lowest ranked VMs remaining at NUMA node 0 110 is migrated to NUMA node 1 120 after migration of VM5 completes, and so on, until sufficient capacity exists on NUMA node 0 110 or NUMA node 1 120 is no longer able to receive additional VMs due to its resource limits. Method 600 then returns to block 604 where VM migration manager 310 executing on processor 112 determines if additional VMs are requested to be executed on NUMA node 0 110 and/or if additional processing resources are required from the existing VMs executing on NUMA node 0 110.

Method 600 allows VMs that are computing resource intensive to remain assigned to their current associated NUMA node for execution and for VMs that are less computing resource intensive to be migrated to another NUMA node for execution. Method 600 increases the processing efficiency of IHS 100 by reducing memory latency associated with the processor of one NUMA node crossing the NUMA node boundary and accessing the system memory of a different NUMA node. Method 600 minimizes inter-NUMA node memory access wait times because (1) the VMs that are more memory resource intensive continue execution on NUMA node 0 110 without interruption and (2) the VMs that use less memory resources are easier to migrate to NUMA node 1 120.

Referring to FIG. 7, an initial assignment of VMs 710 executing on NUMA nodes 110 and 120 is shown. Hypervisor 220 initially assigns VMs for execution to NUMA node 0 110 and hypervisor 270 initially assigns VMs for execution to NUMA node 1 120. Initially, VM1 202, VM2 204, VM3 710, VM4 712, VM5 714, VM6 716, VM7 718, and VM8 720 are assigned to NUMA node 0 110. Initially VM10 252, VM11 254, VM12 730 and VM13 732 are assigned to NUMA node 1 120. As a result of this assignment of VMs and execution by NUMA node 0 110, the processing resources of processor 112 and/or the memory resources of system memory 116 do not have additional processing capacity.

Referring to FIG. 8, a re-assignment of VMs 720 executing on NUMA nodes 110 and 120 is shown. In one embodiment, the re-assignment of VMs is performed according to method 600 by VM migration manager 310, acting within processor 112. Processor 112 reads the ordered array of the multiple VMs 320 from memory 116 and selects at least one VM from the ordered array of the multiple VMs 320 executing on NUMA node 0 110 to be re-assigned for execution from NUMA node 0 110 to NUMA node 1 120. As shown in FIG. 8, processor 112 has selected VM5 714 as the selected VM from among the node 0 VMs 410, because VM5 714 has the lowest processor and memory usage data value relative to the other VMs. VM migration manager 310 triggers processor 112 to migrate VM5 714 from NUMA node 0 110 to NUMA node 1 120 for execution. In FIG. 8, the migrated VM5 714 is indicated by dashed lines and the non-migrated VMs are indicated by solid lines.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for allocating virtual machines (VMs) to run within a non-uniform memory access system having at least a first processing node and a second processing node, the method comprising:
   arranging multiple VMs into an ordered array of VMs based on relative percentages of utilization of memory resources, measured in cycles, by the individual VMs associated with the first processing node as a primary weighing factor utilized in ranking the VMs of the first processing node, and utilizing a utilization of processor resources as a secondary weighting factor, wherein arranging the multiple VMs include:
      ranking the multiple VMs based on processor usage and memory usage, the memory usage including a second memory usage value from a second memory associated with the second processing node and wherein the second memory usage value is the amount of memory used by VMs executing on the first processing node; and
      generating the ordered array of the multiple VMs executing on the first processing node based on the ranking;
   receiving a request at the first processing node for additional capacity for establishing an additional VM on the first processing node having multiple VMs executing thereon;
   in response to receiving the request, identifying whether the first processing node has the additional capacity requested;
   in response to identifying that the first processing node does not have the additional capacity requested, selecting from the ordered array of the multiple VMs executing on the first processing node, at least one VM having low processor and memory usage relative to the other VMs to be re-assigned for execution from the first processing node to the second processing node;
   migrating the at least one selected VM from the first processing node to the second processing node for execution; and
   establishing the additional VM on the first processing node when the migrating of the at least one VM to the second processing node provides the additional capacity requested on the first processing node.

2. The method of claim 1, further comprising:
   generating a plurality of VMs to schedule for execution on at least one of the processing nodes;
   initially assigning the multiple VMs to the first processing node for execution;
   executing the multiple VMs on the first processing node; and
   tracking processor and memory usage data for each of the VMs during execution on the first processing node.

3. The method of claim 2, further comprising:
   storing the ordered array of the multiple VMs to a memory device.

4. The method of claim 1, further comprising:
   triggering the at least one migrated VM to execute on the second processing node.

5. The method of claim 1, wherein ranking the multiple VMs further comprises:
   assigning a higher rank to VMs that are associated with the usage of lower amounts of processor and memory resources than VMs that are associated with the usage of higher amounts of processor and memory resources.

6. The method of claim 5, wherein generating the ordered array of the multiple VMs further comprises:
ordering the highest ranking VMs first into the ordered array of VMs and the lowest ranking VMs last into the ordered array of VMs.

7. The method of claim 2, wherein ranking the VMs is further based on:
a first memory usage value from a first memory associated with the first processing node; and
a percent usage value of the first memory and a processor usage value for a first processor associated with the first processing node.

8. A non-uniform memory access (NUMA) machine comprising:
a plurality of operatively-interconnected NUMA nodes, each of the NUMA nodes having at least one processor and at least one associated memory, the NUMA nodes communicatively coupled by a system interconnect fabric such that the processors of each of the NUMA nodes can access the memory of each of the other NUMA nodes, the NUMA nodes including a first NUMA node having a first processor and a first memory, the first processor having migration manager firmware executing thereon to manage the allocation of virtual machines (VMs) within the NUMA nodes, wherein the migration manager firmware configures the first processor to:
arrange multiple VMs into an ordered array of VMs based on relative percentages of utilization of memory resources, measured in cycles, by the individual VMs associated with the first processing node as a primary weighing factor utilized in ranking the VMs of the first processing node, and utilization of processor resources is utilized as a secondary weighting factor, wherein to arrange the multiple VMs the firmware configures the first processor to:
rank the multiple VMs based on processor usage and memory usage using at least a second memory usage value from a second memory associated with the second processing node and wherein the second memory usage value is the amount of memory used by the first processing node; and
generate the ordered array of the multiple VMs executing on the first NUMA node based on the ranking;
receive a request at the first NUMA node for additional capacity to support establishing an additional virtual machine (VM) on the first NUMA node having multiple VMs executing thereon;
in response to receiving the request, the migration manager identifies whether the first NUMA node has the additional capacity requested;
in response to identifying that the first NUMA node does not have the additional capacity requested, the migration manager selects, from the ordered array of the multiple VMs executing on the first NUMA node, at least one VM having low processor and memory usage relative to the other VMs to be re-assigned for execution from the first NUMA node to a second NUMA node;
migrate the at least one selected VM from the first NUMA node to the second NUMA node for execution; and
establish the additional VM on the first processing node when the migrating of the at least one VM to the second processing node provides the additional capacity requested on the first processing node.

9. The NUMA machine of claim 8, wherein the firmware further configures the first processor to:
generate a plurality of VMs to schedule for execution on at least one of the NUMA nodes;
initially assign the multiple VMs to the first NUMA node for execution;
execute the multiple VMs on the first NUMA node; and
track processor and memory usage data for each of the VMs during execution on the first NUMA node.

10. The NUMA machine of claim 8, wherein the firmware further configures the first processor to:
store the ordered array of the multiple VMs to a memory device.

11. The NUMA machine of claim 8, wherein the firmware further configures the first processor to:
trigger the at least one migrated VM to execute on the second NUMA node.

12. The NUMA machine of claim 8, wherein the firmware further configures the first processor to:
assign a higher rank to VMs that are associated with the usage of lower amounts of processor and memory resources than VMs that are associated with the usage of higher amounts of processor and memory resources.

13. The NUMA machine of claim 8, wherein the firmware further configures the first processor to:
order the highest ranking VMs first into the ordered array of VMs and the lowest ranking VMs last into the ordered array of VMs.

14. An information handling system (IHS) comprising:
a first non-uniform memory access (NUMA) node and a second NUMA node, the first NUMA node having a first processor and a first memory, the second NUMA node having a second processor and a second memory;
a system interconnect fabric communicatively coupling the first NUMA node and the second NUMA node such that the processors of each of the NUMA nodes can access the memory of each of the other NUMA nodes;
the first processor having a migration manager firmware executing thereon to manage the allocation of virtual machines (VMs) within the NUMA nodes, and the migration manager firmware configures the first processor to:
arrange multiple VMs into an ordered array of VMs based on relative percentages of utilization of memory resources, measured in cycles, by the individual VMs associated with the first processing node as a primary weighing factor utilized in ranking the VMs of the first processing node, and utilization of processor resources is utilized as a secondary weighting factor, wherein to arrange the multiple VMs the firmware configures the first processor to:
rank the multiple VMs based on processor usage and memory usage using at least a second memory usage value from a second memory associated with the second processing node and wherein the second memory usage value is the amount of memory used by the first processing node; and
generate the ordered array of the multiple VMs executing on the first NUMA node based on the ranking;
receive a request at the first NUMA node for additional capacity for establishing an additional VM on the first NUMA node having multiple VMs executing thereon;
in response to receiving the request, identify whether the first NUMA node has the additional capacity requested;
in response to identifying that the first NUMA node does not have the additional capacity requested, select from the ordered array of the multiple VMs executing on the first NUMA node, at least one VM having low processor and memory usage relative to the other VMs to be re-assigned for execution from the first NUMA node to the second NUMA node;

migrate the at least one selected VM from the first NUMA node to the second NUMA node for execution; and establish the additional VM on the first processing node when the migrating of the at least one VM to the second processing node provides the additional capacity requested on the first processing node.

15. The information handling system of claim 14, wherein the firmware further configures the first processor to:

generate a plurality of VMs to schedule for execution on at least one of the NUMA nodes;

initially assign the multiple VMs to the first NUMA node for execution;

execute the multiple VMs on the first NUMA node; and track processor and memory usage data for each of the VMs during execution on the first NUMA node.

16. The information handling system of claim 14, wherein the firmware further configures the first processor to:

store the ordered array of the multiple VMs to a memory device.

17. The information handling system of claim 14, wherein the firmware further configures the first processor to:

trigger the at least one migrated VM to execute on the second NUMA node.

18. The information handling system of claim 14, wherein the firmware further configures the first processor to:

assign a higher rank to VMs that are associated with the usage of lower amounts of processor and memory resources than VMs that are associated with the usage of higher amounts of processor and memory resources.

19. The information handling system of claim 14, wherein the firmware further configures the first processor to:

order the highest ranking VMs first into the ordered array of VMs and the lowest ranking VMs last into the ordered array of VMs.

* * * * *